Jan. 2, 1951 H. E. QUEEN 2,536,219
PORTABLE SUCTION CLEANER
Filed Oct. 10, 1947 2 Sheets-Sheet 1

Inventor
H. E. Queen,
By Munn & Lane
Attorney

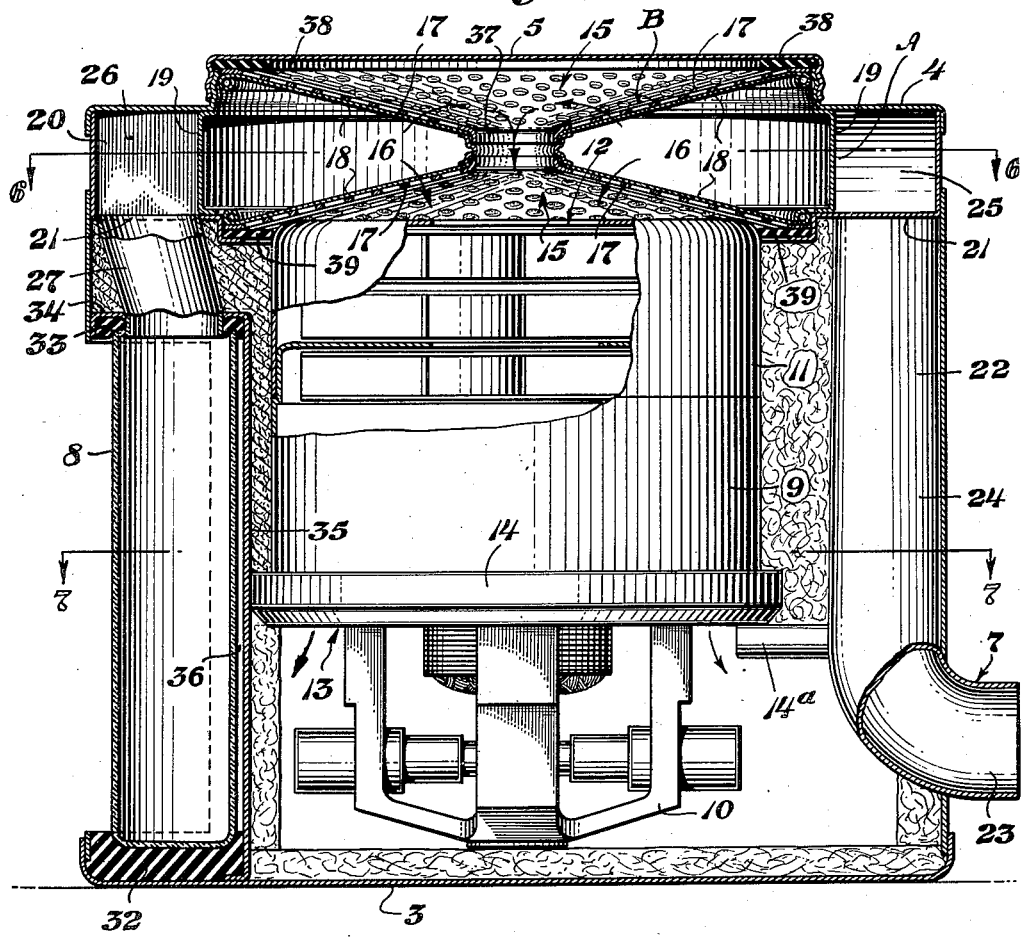

Patented Jan. 2, 1951

2,536,219

UNITED STATES PATENT OFFICE 2,536,219

PORTABLE SUCTION CLEANER

Harold E. Queen, Berkeley, Calif.

Application October 10, 1947, Serial No. 779,129

17 Claims. (Cl. 183—37)

The invention relates primarily to portable suction cleaning apparatus, and more particularly to improved means for separating the dust and other impurities from the air which is drawn into the apparatus during the cleaning operation.

In cleaning apparatus of this type the dust separating operation is generally performed by filtering means which may include porous fabric, porous paper, or a combination of such filtering elements.

In accordance with my improvement I provide means for separating the heavier particles from the air and deposit such particles in a readily accessible imperforate trap or pocket, preferably readily removable and formed of transparent material, such as "Vinylite" or other plastic which is light and not readily broken, so that the contents of the pocket may be viewed, and when filled the pocket may be readily emptied. The centrifugal separating means may be and preferably is combined with filtering means for separating the lighter particles not readily removed by the centrifugal separation, from which filtering means the accumulated dust is automatically removed by a whirling air stream and deposited in the trap or pocket.

A primary object of the invention is initially to separate dirt centrifugally from a whirling body of air and deposit the dirt in a trap or pocket of transparent material where the dirt may be viewed and the pocket being readily removable for emptying.

Other features of the invention contribute to the convenience of operation, lightness, compactness, portability and stability when sitting on the floor, being adapted to be dragged about by a hose pipe, or the like, with which the apparatus may be fitted for various cleaning operations, or being readily carried from place by place by means of a suitable bail or handle.

In accordance with the preferred embodiment of my invention the separating means is incorporated in a suction cleaner comprising a tubular body portion having suction producing means housed within the body portion for drawing dust laden air through the cleaner. Separating means are provided in the cleaner communicating with the suction producing means and comprising centrifugal means for separating heavy particles from the air stream and independent air filtering means for separating the lighter particles from the air stream, and an imperforate removable trap communicating with and adapted to receive heavy particles directly from the centrifugal separator, which particles preferably fall into the trap by gravity.

The invention will be more readily understood by reference to the accompanying drawing and the following detailed description, in which are set forth by way of illustration a preferred embodiment of the inventive thought, it being understood that the invention in its broadest aspects is not limited to the particular details of construction or arrangement of parts disclosed in the specific embodiment.

In the drawings:

Fig. 5 is a sectional view of the cleaner on a scale larger than that of the preceding figures, the section being taken in a plane which includes the central longitudinal axis of the cleaner and which passes through the removable pocket and the inlet pipe, parts being shown in elevation;

Fig. 8 is a perspective view of the filtering means on a scale smaller than that of Fig. 5, and Fig. 9 is a diagrammatic view on a reduced scale showing the cleaner equipped with cleaning attachments.

Figure 1:
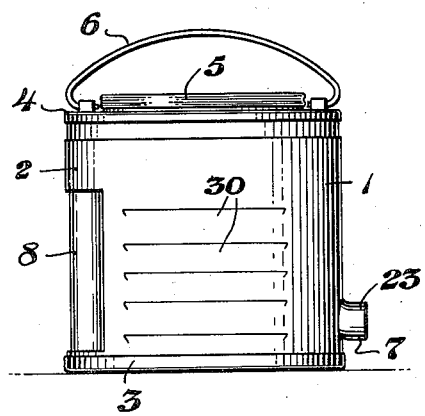
Fig. 1 is a side elevation of the cleaner with the dust collecting pocket and cleaner attachments removed.
Figure 3:
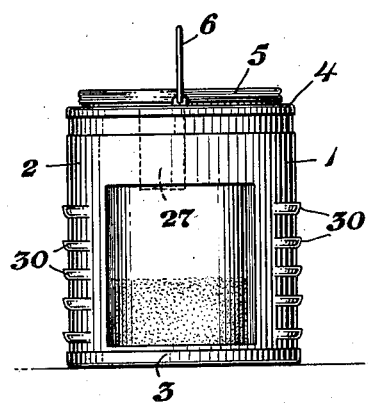
Fig. 3 is a rear view of the cleaner showing the dust collecting pocket in position.
Figure 4:
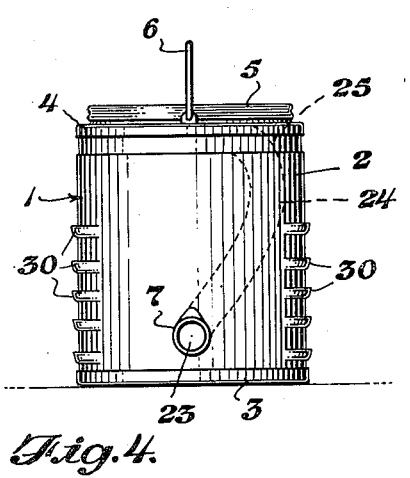
Fig. 4 is a front view of the cleaner with a portion of the air inlet pipe shown in dotted lines.
Figure 2:
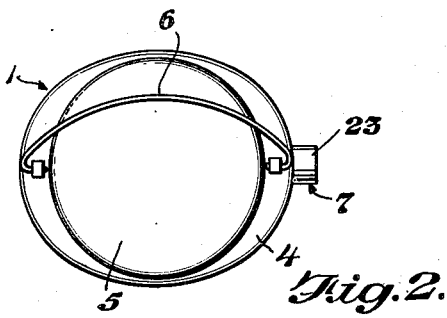
Fig. 2 is a top plan view of the cleaner.

Referring to the drawings, reference numeral 1 denotes a tubular body, casing or housing having an upright wall 2, a removable bottom 3, a top 4 having a central opening therein, a cover 5 for the opening, and a bail or handle 6 for moving the cleaner from place to place. The tubular body or housing is provided with an inlet tube generally designated by the numeral 7, to the lower end of which may be attached suitable connecting elements, either flexible or rigid, or both, which may be equipped with suitable cleaning tools for walls, floors, draperies, and the like, as is well known in the art, and as diagrammatically indicated in Fig. 9. The inlet tube communicates at its upper end with the dust separating mechanism housed within the casing 1.

The tubular housing may be of any suitable construction, being either relatively short and of large cross sectional area, as herein shown, in order to lend stability, or may be of elongated and relatively less cross sectional area, in which case the housing may rest upon its side, all as well known in the cleaner art.

In accordance with the present invention the tubular casing 1 is provided with a readily accessible removable pocket 8, herein shown as fitted within the confines of the housing, the side wall 2 of which is recessed to receive the pocket. The pocket is preferably formed of transparent material, such as "Vinylite" or other transparent plastic, and is adapted to receive particles of either solid or liquid material separated by centrifugal action from the air passing through the cleaner.

The tubular body portion 1 encloses a suction producing unit 9, which may be of any suitable construction, which is designed to draw dust laden air into the housing from the inlet pipe 7 and to discharge the cleaned air after the separation of dust and other material, preferably through louvers or other openings formed in the wall of the body portion or housing 1. As shown, the suction producing unit includes an electric motor 10 of any suitable construction adapted to drive one or more fans, preferably of centrifugal type, housed within a fan casing 11, the inlet to the fan casing being at the upper end 12 and the exhaust at the lower end 13. The suction producing unit may be supported upon a ring 14 carried by brackets 14a secured to the body portion in any suitable manner.

Operatively associated with the suction producing unit and preferably mounted above and communicating with the fan inlet 12 is my improved separating means, which preferably includes peripherally located centrifugal means A for removing the heavier particles from the incoming air and for depositing them in the trap or pocket 8, and filtering means B coacting with the centrifugal means for collecting the lighter particles which are not readily removed by the centrifugal or whirling action. The filtering means B is preferably located interiorly of the centrifugal separating means A with respect to the central longitudinal axis of the cleaner and is so shaped and arranged with reference to the centrifugal separating means that the dust and lint arrested by the filter will be scoured from the filter by the rotating air stream and deposited into the trap or pocket.

Figure 6:
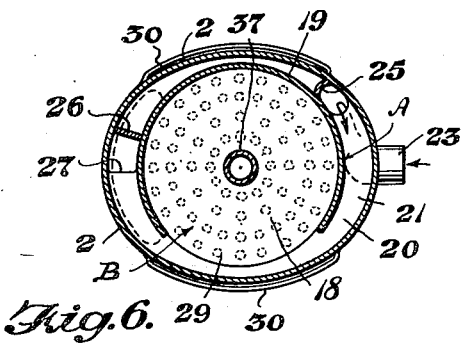
Fig. 6 is a section on a reduced scale on the line 6—6 of Fig. 5.
Figure 7:
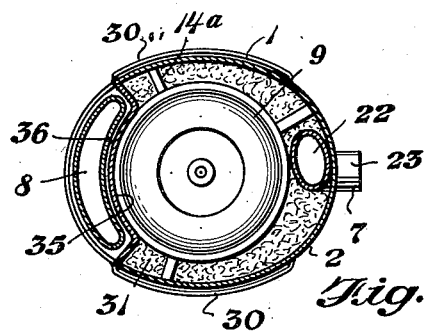
Fig. 7 is a section also on a reduced scale on the line 7—7 of Fig. 5.

As shown in Fig. 5 the upper part of the tubular housing 1 is divided into two chamber portions 15 and 16 by means of the dust filter B. The chamber 15 is of hourglass shape, with the lower portion thereof communicating with the inlet 12 of the fan casing 11, said chamber 15 having a central opening 37 connecting the two halves of the chamber. The chamber 15 is separated from the outer annular circulating chamber 16 by means of the filter B, which comprises filter walls consisting of two stiff perforated truncated cones 17 which support smooth filtering material. The cones may be formed of metal or other suitable material, and the smooth filtering media 18 may be cloth or porous paper, preferably the latter. Surrounding the annular chamber for the greater part of its circumference, but open along one side at 29, is a vertical wall 19, best shown in Figs. 5 and 6. Surrounding the wall 19 is a centrifugal chamber 20 bounded by the inner wall 19 and outer wall which constitutes an extension of the main casing wall 2, the casing top 4 and the floor or partition 21.

Dust laden air is supplied to the separating means through the passage 22 of the inlet tube 7, which tube includes at its lower end an external elbow 23 to which cleaning attachments, such as flexible tube H, a stiff pipe or wand W, and a cleaning tool T (Fig. 9) are adapted to be detachably secured. The inlet pipe 7 also includes a curved upright pipe section 24 which terminates at its upper end in a reversely curved elbow 25 which discharges tangentially into the chamber 20 and provides one end of said chamber.

At the side of the housing 1 remote from the elbow 25 is a wall 26 which forms the other end of the chamber 20, and a tube 27 connecting the separating chamber 20 with the pocket 8.

In operation, a hose H connected to a wand W and having an application tool T at one end thereof is joined to the inlet elbow 23, and a swiftly moving current of air, caused by the suction producing unit 9, erodes and entrains dirt from the surface being cleaned and transports this dirt to the casing 1. Air and dirt are projected and tangentially into the chamber 20 by reason of the shape and direction of the elbow 25 and are caused to follow the curved wall 2. The air is drawn through the gap 29 formed between the ends of the wall 19 and into the annular chamber 16 while the entrained dirt continues along the wall 2 until it strikes the partition wall or abutment 26 and drops by gravity through the tube 27 into the pocket 8. Lighter particles of the dirt which may have entered the annular chamber 16 through the gap 29 are prevented from continuing into the fan chamber by the filter 18. Since the volume of the annular chamber 16 is small the air is moving swiftly across its surface and the arrested dirt and lint is scoured from the filter 18 and agglomerated into bunches which are thrown out through the gap 29 and continue into the pocket 8. The pocket 8 may be observed from time to time by the operator and emptied as required. Heavy articles collected by the cleaner, such as buttons or coins, may be observed and retrieved. The complete cleaner is much lighter than the usual vacuum cleaner and may, if desired, be carried in one hand by the operator while the application tool is applied with the other hand.

Filtered and cleaned air entering the fan casing is expelled at the lower end 13 whence it passes to the atmosphere through louvers 30, see Fig. 1. Sound deadening material 31 may be used to line the interior of the walls 2 of the casing 1.

As shown in Fig. 5, the pocket 8 is open at the top, and is curved to conform to the outer wall 2 of the casing 1 and to the motor unit 9. The pocket may be installed by pressing it down against a resilient pad 32, and then allowing it to be pressed upward by the pad against a second resilient pad 33 which is an annular ring surrounding the lower end of the tube 27. The pad 33 is restrained by an annular channel 34. A partition 35 forms a recess 36 surrounding the removable pocket 8 and closes the rear end of the casing 1.

The filters 18, 18 may be removed for inspection or renewal by unscrewing the cover 5 and lifting out the filter supporting cones 17, 17 and a connecting tube 37. A resilient upper gasket 38 and a lower resilient gasket 39, together with the screw cover 5, maintain a pressure on the filters 18, 18 and the cones 17, 17 and the connector 37. The lower gasket 39 also contacts the fan casing 11 and prevents a recirculation of air to chamber 15. The suction producing unit may be removed, after the filters have been removed, by releasing the screws which attach the ring 14 to the supporting brackets 14a.

The invention has been described in detail for the purpose of illustration, but it will be obvious that numerous modifications and variations may be resorted to without departing from the spirit of the invention.

A characteristic feature of the invention resides in the centrifugal separation of dust from the air and the delivery of dirt into the removable pocket 8 through an opening in the wall or floor near the wall. The pocket is airtight except for the tube 27. Any air leak at the pad 33 picks up the dirt already in the pocket and returns it to the chambers 20 and 16. The dirt particles are thrown into a space of turbulent air, which, however, has no carrying ability. Smooth filter paper appears to be the best material for the filters 18, although other materials might be used if desired.

I claim:

1. A suction cleaner comprising an upright tubular body member, suction producing means housed within the lower portion of said body member for drawing dust laden air through the cleaner, stationary centrifugal separating means also located within the upper portion of the body member communicating with the suction producing means and comprising a circulating chamber, and a removable imperforate trap arranged exteriorly of the circulating chamber adapted to receive particles from the circulating chamber by a centrifugal action, said body having an external recess in which the trap is mounted.

2. A suction cleaner comprising a tubular body portion, suction producing means housed within said body portion for drawing dust laden air through the cleaner, stationary centrifugal means also housed within the body portion and communicating with the suction producing means for separating particles from the air stream, and a removable imperforate trap adapted to receive particles from the centrifugal separator, said body portion having an external recess in which said trap is mounted.

3. A suction cleaner comprising a tubular body portion, suction producing means housed within said body portion for drawing dust laden air through the cleaner, stationary centrifugal means also housed within the body portion communicating with the suction producing means for separating particles from the air stream, and a removable imperforate trap adapted to receive particles from the centrifugal separator, said body portion having an external recess in which said trap is mounted, the wall of said trap being transparent so that the contents is visible to an operator.

4. A suction cleaner comprising a tubular body portion, suction producing means housed within said body portion for drawing dust laden air through the cleaner, stationary centrifugal means also housed within the body portion communicating with the suction producing means for separating particles from the air stream, a removable imperforate trap adapted to receive particles from the centrifugal separator, and an inlet tube for dust laden air communicating at one end with said suction producing means, the wall of said body portion being recessed to receive the trap.

5. A suction cleaner comprising a tubular body member, suction producing means housed within the lower portion of said body member for drawing dust laden air through the cleaner, stationary separating means housed within the upper portion of the body member and communicating with the suction producing means, said separating means comprising centrifugal means for separating heavy particles from the air stream and independent air filtering means for separating the lighter particles from the air stream, and an imperforate trap located externally of the body portion, said trap communicating with the separating means and adapted to receive particles therefrom.

6. In a device of the character described, a tubular body having upper and lower portions, suction producing means housed in the lower portion of said body for drawing dust laden air through the apparatus, stationary centrifugal means housed in the upper portion of said body communicating with the suction producing means for separating particles from the air stream, and a removable imperforate trap outside of said body portion communicating with and adapted to receive particles from the centrifugal separator, the wall of the tubular body being externally recessed to receive the trap, and said trap being transparent so that the contents are visible.

7. In a device of the character described, a tubular body having upper and lower portions, suction producing means housed in the lower portion of said body for drawing in dust laden air, separating means housed within the upper portion of said body and communicating with the suction producing means, said separating means comprising centrifugal means for separating heavy particles from the air stream and independent air filtering means also located in the upper portion of said body for separating the lighter particles from the air stream prior to the entry of the air into the lower portion containing the suction producing means, and a removable imperforate trap located externally of said body portion communicating with the separating means and adapted to receive heavy particles therefrom.

8. In a device of the character described, a tubular body having upper and lower portions, suction producing means housed in the lower portion of said body for drawing in dust laden air, stationary separating means housed in the upper portion of said body and communicating with the suction producing means, comprising centrifugal means for separating heavy particles from the air stream and independent air filtering means for separating the lighter particles from the air stream, and a removable imperforate trap located externally of said tubular body communicating with the separating means and adapted to receive heavy particles therefrom, said trap being transparent so that the contents are visible.

9. In a cleaner as defined in claim 1, a filtering area disposed parallel to the direction of motion of the dust laden air such that the dust laden air tends to sweep across the filter area and the dust is projected across and beyond the filter.

10. A suction cleaner comprising a tubular body member, suction producing means housed in the lower portion of said body member, stationary dust separating means housed in the upper portion of said tubular member, an inlet tube for dust laden air communicating at one end with said dust separating means, and a removable imperforate dust trap located externally of said body member at a lower level than said dust separating means and communicating therewith to receive therefrom particles removed from the air by said separator means, the wall of said tubular body member being recessed to receive the trap.

11. A suction cleaner comprising a tubular body member, suction producing means housed in the lower portion of said body member, stationary dust separating means housed in the upper portion of said tubular member, an inlet tube for dust laden air communicating at one end with said dust separating means, a removable imperforate dust trap located externally of said body member at a lower level than said dust separating means and communicating therewith to receive therefrom particles removed from the air by said separator means, said dust separating means comprising an outer centrifugal chamber with which the inlet tube communicates for separating relatively heavy particles from the dust stream, and an air filtering chamber including filtering means centrally located with reference to the outer chamber.

12. A suction cleaner comprising a tubular body member, suction producing means housed in the lower portion of said body member, stationary dust separating means housed in the upper portion of said tubular member, an inlet tube for dust laden air communicating at one end with said dust separating means, a removable imperforate dust trap located externally of said body member at a lower level than said dust separating means and communicating therewith to receive therefrom particles removed from the air by said separator means, said dust separating means comprising an outer centrifugal chamber with which the inlet tube communicates for separating relatively heavy particles from the dust stream, an air filtering chamber including filtering means centrally located with reference to the outer chamber, and a discharge tube located diametrically opposite the inlet tube connecting said centrifugal chamber with said trap.

13. A suction cleaner comprising a tubular body member, suction producing means housed in the lower portion of said body member, stationary dust separating means housed in the upper portion of said tubular member, an inlet tube for dust laden air communicating at one end with said dust separating means, a removable imperforate dust trap located externally of said body member at a lower level than said dust separating means and communicating therewith to receive therefrom particles removed from the air by said separator means, said dust separating means comprising an outer centrifugal chamber with which the inlet tube communicates for separating relatively heavy particles from the dust stream, and an air filtering chamber including filtering means centrally located with reference to the outer chamber, said filtering means being of hourglass shape.

14. A suction cleaner comprising a tubular body member, suction producing means housed in the lower portion of said body member, stationary dust separating means housed in the upper portion of said tubular member, an inlet tube for dust laden air communicating at one end with said dust separating means, a removable imperforate dust trap located externally of said body member at a lower level than said dust separating means and communicating therewith to receive therefrom particles removed from the air by said separator means, said dust separating means comprising an outer centrifugal chamber with which the inlet tube communicates for separating relatively heavy particles from the dust stream, an air filtering chamber including filtering means centrally located with reference to the outer chamber, a vertical abutment located diametrically opposite the inlet pipe closing said centrifugal chamber at one end, and a discharge pipe connecting said centrifugal chamber with said trap.

15. A suction cleaner comprising a tubular body member, suction producing means housed in the lower portion of said body member, dust separating means housed in the upper portion of said tubular member, an inlet tube for dust laden air communicating at one end with said dust separating means, a removable imperforate dust trap located externally of said body member at a lower level than said dust separating means and communicating therewith to receive therefrom particles removed from the air by said separator means, said dust separating means comprising an outer centrifugal chamber with which the inlet tube communicates for separating relatively heavy particles from the dust stream, and an air filtering chamber including filtering means centrally located with reference to the outer chamber, said dust separating means having a curved inner wall conforming generally with and spaced from the outer wall of the tubular body member, said curved wall separating the outer centrifugal chamber from the filtering chamber, the ends of said curved inner wall being spaced apart to provide a gap to allow passage of air from said outer centrifugal chamber to the filtering chamber and to allow dust to pass from the filtering chamber to the outer chamber.

16. A suction cleaner comprising a tubular body member, suction producing means housed in the lower portion of said body member, dust separating means housed in the upper portion of said tubular member, an inlet tube for dust laden air communicating at one end with said dust separating means, a removable imperforate dust trap located externally of said body member at a lower level than said dust separating means and communicating therewith to receive therefrom particles removed from the air by said separator means, said dust separating means comprising an outer centrifugal chamber with which the inlet tube communicates for separating relatively heavy particles from the dust stream, and an air filtering chamber including filtering means centrally located with reference to the outer chamber, said dust separating means having a curved inner wall conforming generally with and spaced from the outer wall of the tubular body member, said curved wall separating the outer centrifugal chamber from the filtering chamber, the ends of said curved inner wall being spaced apart to provide a gap to allow passage of air from said outer centrifugal chamber to the filtering chamber and to allow dust to pass from the filtering chamber to the outer chamber, the filtering means being of hourglass shape and being located directly above the suction producing means.

17. A suction cleaner comprising a tubular body member, suction producing means housed in the lower portion of said body member, dust separating means housed in the upper portion of said tubular member, an inlet tube for dust laden air communicating at one end with said dust separating means, a removable imperforate dust trap located externally of said body member at a lower level than said dust separating means and communicating therewith to receive therefrom particles removed from the air by said separator means, said dust separating means comprising an outer centrifugal chamber with which the inlet tube communicates for separating relatively heavy particles from the dust stream, an air filtering chamber including filtering means centrally located with reference to the outer chamber, said dust separating means having a curved inner wall conforming generally with and spaced from the outer wall of the tubular body member, said curved wall separating the outer centrifugal chamber from the filtering chamber, the ends of said curved inner wall being spaced apart to provide a gap to allow passage of air from said outer centrifugal chamber to the filtering chamber and to allow dust to pass from the filtering chamber to the outer chamber, the filtering means being of hourglass shape and being located directly above the suction producing means, and an annular circulating chamber within the filtering chamber formed by said curved wall and by the oppositely inclined wall of the hourglass shaped filter.

HAROLD E. QUEEN.

REFERENCES CITED

The following references are of record in the file of this patent:

UNITED STATES PATENTS

| Number | Name | Date |
|---|---|---|
| 1,835,770 | Gasner et al. | Dec. 8, 1931 |
| 2,198,568 | Yonkers | Apr. 23, 1940 |
| 2,060,168 | Brock | Nov. 10, 1936 |

FOREIGN PATENTS

| Number | Country | Date |
|---|---|---|
| 438,829 | Germany | Dec. 24, 1926 |